May 17, 1966  M. J. PASCULLE  3,252,068
COMPOUND DIRECT CURRENT MOTOR INCLUDING AN ARMATURE
REACTION SPEED CONTROL WINDING
Filed June 28, 1963

WITNESSES
Theodore F. Wrobel
Edward F. Possessky

INVENTOR
Maurice J. Pasculle
BY
ATTORNEY

United States Patent Office 3,252,068
Patented May 17, 1966

3,252,068
COMPOUND DIRECT CURRENT MOTOR INCLUDING AN ARMATURE REACTION SPEED CONTROL WINDING
Maurice J. Pasculle, Pittsburgh, Pa., assignor to Westinghouse Electric Corporation, Pittsburgh, Pa., a corporation of Pennsylvania
Filed June 28, 1963, Ser. No. 291,582
4 Claims. (Cl. 318—252)

The present invention relates to dynamoelectric machines and more particularly to the speed regulation of direct current motors.

One of the chief advantages of D.C. motors is the ease with which motor speed control can be obtained, for example by external servomechanic or manual energization control of a shunt field winding. Such control normally provides a family of speed vs. load characteristics all of which are nonlinear, yet there are many applications where D.C. motor speed is desirably controlled as a linear function of load over the rated load range of the motor. Examples of such applications are those associated with tandem cold mills and hot strip mills. Thus, in tandem cold mills where steel strip is reduced in thickness as it passes through successive motor driven rolls, accurate speed control of the respective rolls is required in order to prevent pulling or buckling forces from being applied to the steel strip between successive rolls and linear variations of motor speed as a function of load facilitates the achievement of such accuracy.

More specifically, in terms of motor operating theory, the usual types of D.C. motors (as classified by field structure) are characterized with variable speed as a function of load. The series field motor, wherein pole flux depends primarily on armature current, operates with substantially decreasing speed as a nonlinear function of increasing load whereas the shunt field motor, wherein pole flux can depend primarily on applied line voltage, operates with slight increasing or decreasing (usually decreasing) speed as a function of increasing load depending on the magnetic design of the motor. The separately excited field motor (assuming constant excitation) is substantially equivalent to the shunt field motor with respect to speed variation as a function of load.

The compound field motor (namely one with a shunt field and a cumulative or differential series field) has a speed vs. load characteristic intermediate to that of the shunt field motor and that of the series field motor, depending on the field design. Because of the resultant interaction of the series field flux and the shunt field flux, however, it is difficult if not impossible to obtain motor speed as a linear function of load over rated load range by structurally adjusting the shunt and series fields and the relative magnetic field effects thereof.

In conceptualizing the manner in which D.C. motor speed can be controlled, it is desirable that speed-load linearization be obtained by internal control action alone rather than in conjunction with complicating external feedback circuitry or the like.

Since D.C. motor speed is given by:

$$\eta = \frac{V_{ta} - I_a \times R_a}{K_E \times \phi}$$

where:
$V_{ta}$ = armature terminal voltage
$I_a$ = armature current
$R_a$ = armature resistance
$\phi$ = flux per pole
$K_E$ = motor constant dependent upon the number of poles, the number of armature conductors and the number of parallel paths through the armature, it is clear that with varying load (or armature current) motor speed is dependent upon the pole flux.

Hence, although conventional D.C. motor field arrangements are characterized with a disability in this respect, it is preferable that the motor field structure itself be so arranged as to respond to changing load with compensatory pole flux action which would provide for linear rather than nonlinear speed variation as a function of load. In this manner, a speed linearizing feedback path would be incorporated in the machine itself and pole flux control action would be dependent on information produced in this feedback path.

In accordance with the broad principles of the present invention, a D.C. motor comprises field and armature structures and the field structure includes means or shunt field winding for producing a substantially constant component of magnetic flux, as well as means or an armature reaction speed control field winding for producing a variable component of magnetic flux. Preferably, means or a series winding are also provided for producing a component of flux which varies linearly with load and as a consequence of the varying pole flux resulting from the interaction of flux producing means of the field windings, motor speed varies as a substantially linear function of load over the rated load range of the motor. Such linear control follows from the pole flux control produced by the armature reaction speed control winding or windings which are energized for example by brush means disposed in engagement with the armature commutator in the proximity of the neutral zone where the pole flux is subject to modification by the variable armature reaction flux over rated load range of the motor.

It is therefore an object of the present invention to provide a novel D.C. motor which is characterized with a substantially linear speed-load characteristic over its rated load range.

Another object of the invention is to provide a novel D.C. motor in which the speed-load characteristic is substantially linearized by means of pole flux control obtained through the employment of a field winding having its energization dependent on the variant effect of armature reaction flux over the rated load range of the motor.

These and other objects of the invention will become more apparent upon consideration of the following detailed description along with the attached drawings, in which.

Figure 1:
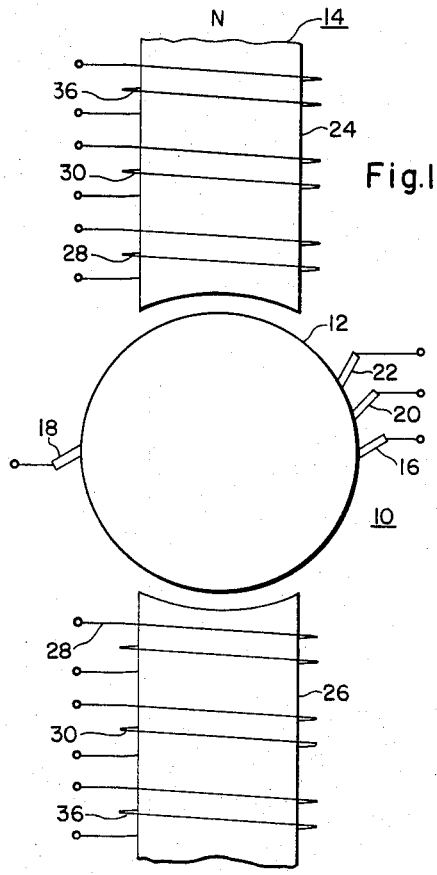
FIGURE 1 is a diagrammatic view of a D.C. motor constructed in accordance with the principles of the invention.

More specifically, there is shown in FIG. 1 a dynamoelectric machine or D.C. motor 10 having an armature structure including a rotor 12 and a field structure including a stator 14 (partially shown). The rotor 12 is preferably laminated to reduce eddy current losses and is, in this case, provided with a commutator (not shown) with which main brushes 16 and 18 and preferably a pair of auxiliary brushes 20 and 22 are in conductive sliding engagement.

The main brushes 16 and 18 are disposed, as is usual, substantially in the neutral zone. The auxiliary brushes 20 and 22 are disposed in proximity to the neutral zone and adjacent one side thereof, and as explained subsequently only one auxiliary brush 20 or 22 need be provided if desired. In other respects, the rotor 12 is suitably supported on a shaft for rotation in response to the magnetic force of the magnetic stator pole flux acting on the current carrying rotor conductors (not shown).

The stator 14 has at least a pair of poles 24 and 26 as shown, but it can have a plurality of pole pairs depending on the motor design. Main and auxiliary brushes corresponding to the brushes 16, 18 and 20–22 would preferably be provided for each pole pair.

Figure 2:
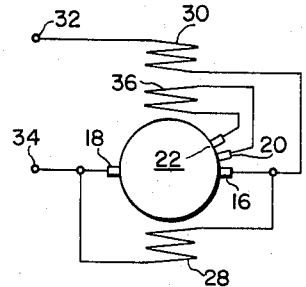
FIG. 2 shows a schematic circuit representation of a D.C. motor constructed in accordance with the principles of the invention.

Means for producing a substantially constant component of flux or a shunt field winding 28 are suitably provided on each pole pair 24 and 26 and connected in long shunt or in short shunt, as shown in FIG. 2, with the main brushes 16 and 18. Preferably, the shunt field winding 28 provides the main component of pole flux so that wide variation of pole flux with armature current is avoided.

In addition, there is preferably provided means for producing a component of flux which varies linearly as a function of load, namely a series field winding 30 connected in series with motor terminals 32 and 34 and main brushes 16 and 18. Thus, the pole flux produced by the series field winding 30 increases substantially linearly with increasing armature current.

Variable flux producing means or an armature reaction speed control field winding 36 are also provided on each pole pair 24 and 26 and the opposite ends of this winding are connected to the auxiliary brushes 20 and 22. It is noted that the field winding 36 is referred to as an "armature reaction" speed control field winding simply because the speed control field voltage of the winding 36 is determined in a significant manner by the extent to which the armature reaction flux affects the distribution of pole flux density over the rotor periphery. This would normally be true even if an armature reaction compensating winding (not shown) is also provided in the motor 10.

One of the auxiliary brushes 20 and 22 can be omitted as previously noted so long as the voltage applied to the winding 36 is determined in a significant manner as just described and the associated free end of the winding 36 can be connected instead to the main brush 16 or 18 depending on which side of the neutral zone the auxiliary brush 20 and 22 is disposed. Whether it is desired to obtain increasing or decreasing field voltage across the armature reaction field winding 36 is determinative of the side of the neutral zone on which the auxiliary brushes 20 and 22 (or one of these brushes) are disposed.

Figure 3:
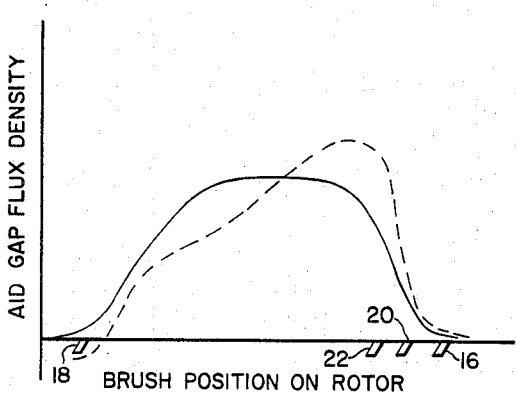
FIG. 3 shows the manner in which air gap pole flux density varies over a portion of the rotor periphery with and without the effect of armature reaction.

As shown in FIG. 3, the pole flux density under a pole at no load is distributed over the rotor periphery as indicated by the curve 38. With increasing armature current, armature reaction flux modifies the distribution of pole flux density to that denoted by the dotted curve 40 in FIG. 3. Hence, with the auxiliary brushes 20 and 22 disposed on the rotor periphery as indicated in FIGS. 1–3, the armature voltage applied thereacross increases with increasing armature current or armature reaction flux. This relationship of the armature reaction speed control field voltage to increasing armature current or load is indicated by the nonlinear energization curve 42 in FIG. 4.

If the auxiliary brushes 20 and 22 are disposed on the opposite side of the neutral zone, increasing armature current results in decreasing voltage applied to the armature reaction speed control winding 36. In either case, the applied voltage across the armature reaction speed control winding 36 is substantially nonlinear with increasing load and can be arranged or designed to provide control of the resultant pole flux so as to obtain a linear speed-load characteristic over the rated load range of the motor 10.

Figure 4:
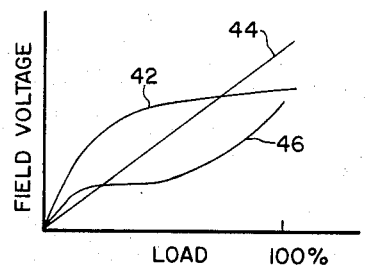
FIG. 4 shows actual or effective field voltage applied across or resulting from that applied across various field windings of the motor as a function of load.

As shown in FIG. 4, increasing voltage is applied across the series field winding 30 with increasing load and this relationship is substantially linear as indicated by the field energization curve 44. The speed-load characteristic of a conventional shunt series motor is nonlinear as indicated by dotted S-curve 48 in FIG. 5, and as already indicated such nonlinearity is to be avoided in many motor applications.

In this illustrated embodiment of the invention, the pole flux produced by the armature reaction speed control winding 36 is preferably differential, or disposed in bucking relation to the pole flux produced by the series field winding 30. The resultant of the magnetic interaction of the windings 30 and 36 is thus an effective differential field energization curve 46 which is generally S-shaped. This or a similar nonlinearity in the curve 46 is effective to produce the speed linearization desired. Hence, the overall resultant pole flux, including that due to the shunt field winding 28, is controlled such that motor speed as a function of load is substantially linear (although normally somewhat drooping) as indicated by the line 50 in FIG. 5. Such speed linearity is to be contrasted with the nonlinearity of the dotted curve 48 which represents the speed-load characteristic of a motor without the control effect of the armature reaction speed control winding 36. The slope of the line 50 increases with increasing field voltage effect from the conventional series field winding 30.

Figure 5:
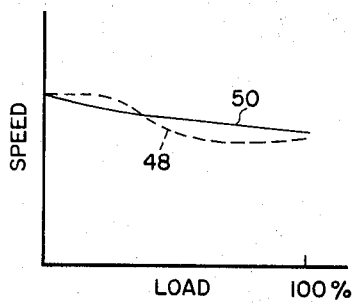
FIG. 5 shows the character of the variation of motor speed as a function of load.

Thus, a linear motor speed-load characteristic is obtained in this embodiment of the invention through control of the pole flux by means of the voltage obtained from the auxiliary brushes 20 and 22, or from one of the main brushes 16 or 18 and one of the auxiliary brushes 20 or 22, and applied to the armature reaction speed control winding 36. In other applications of the invention, the series field winding 30 can be disposed in cumulative magnetic flux relation with the armature field winding 36 or eliminated altogether so long as the motor design is such that the interactional effect of the nonlinear control winding energization curve 42 is that of linearizing the motor speed-load characteristic. Further, the positioning of the auxiliary brush or brushes, the utilization of the conventional series field winding 30, the number of turns for each field winding and other design factors are interrelated such that a linear speed-load characteristic similar to that noted by the line 50 in FIG. 5 is obtained.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A direct current motor comprising a stator member and a rotor member suitably supported for rotation relative to said stator, said stator having at least one magnetic pole pair disposed to form a magnetic flux circuit through said rotor, a shunt field winding and a series field winding and an armature reaction speed control field winding disposed on said stator pole pair, said series field winding and said armature reaction field winding arranged in differential magnetic relation on said stator pole pair, said armature reaction field winding having its ends connected to respective brushes disposed in proximity to each other, at least one of said brushes disposed in proximity to but outwardly from the neutral zone so that the voltage applied across said armature reaction field winding varies as a function of armature reaction flux and in conjunction with said series field winding thereby controls pole flux in such a nonlinear manner as to provide a substantially linear speed-load characteristic over the rated load range of said motor.

2. A direct current motor comprising a stator member and a rotor member suitably supported for rotation relative to said stator, said stator having at least one main magnetic pole pair disposed to form a magnetic flux circuit through said rotor and produce a flux density distribution pattern over the periphery of the rotor member, at least a shunt field winding and an armature reaction speed control field winding disposed on said stator pole pair, at least one pair of main brushes disposed substantially in the neutral zone, said armature reaction field winding having its ends connected to respective auxiliary brushes disposed within the area of the flux density pattern in proximity to each other and said neutral zone so that the voltage applied across said armature reaction field winding varies as a function of armature reaction flux and thereby controls pole flux in such a nonlinear manner as to provide a substantially linear speed-load characteristic over the rated load range of said motor.

3. A direct current motor comprising a stator member and a rotor member suitably supported for rotation relative to said stator, said stator having at least one magnetic pole pair disposed to form a magnetic flux circuit through said rotor, a shunt field winding and a series field winding and an armature reaction speed control field winding disposed on said stator pole pair, at least one pair of main brushes disposed substantially in the neutral zone, said armature reaction field winding having its ends connected to respective auxiliary brushes disposed in proximity to each other and said neutral zone so that the voltage applied across said armature reaction field winding varies as a function of armature reaction flux and in conjunction with said series field winding controls pole flux in such a nonlinear manner as to provide a substantially linear speed-load characteristic over the rated load range of said motor.

4. A direct current motor comprising a stator member and a rotor member suitably supported for rotation relative to said stator, said stator having at least one magnetic pole pair disposed to form a magnetic flux circuit through said rotor, a shunt field winding and a series field winding and an armature reaction speed control field winding disposed on said stator pole pair, said series field winding and said armature reaction field winding arranged in differential magnetic relation on said stator pole pair, at least one pair of main brushes disposed substantially in the neutral zone, said armature reaction field winding having its ends connected to respective auxiliary brushes disposed in proximity to each other and said neutral zone so that the voltage applied across said armature reaction field winding substantially depends on armature reaction flux and varies nonlinearly as a function of load and in conjunction with said series field winding controls pole flux in such a manner as to provide a substantially linear speed-load characteristic over the rated load range of said motor.

References Cited by the Examiner

UNITED STATES PATENTS

| | | | |
|---|---|---|---|
| 1,694,253 | 12/1928 | Forsberg | 318—353 |
| 1,732,367 | 10/1929 | Kleinschmidt | 318—353 |
| 1,912,075 | 5/1933 | Hansen | 310—149 |
| 2,442,213 | 5/1948 | Ross | 318—351 |
| 2,666,882 | 1/1954 | Pasculle | 318—350 |

FOREIGN PATENTS 417,137  9/1934  Great Britain.

OTHER REFERENCES

"Electric Machinery," McGraw-Hill, New York, 1952, pp. 236–244.

ORIS L. RADER, *Primary Examiner.*

G. SIMMONS, *Assistant Examiner.*